May 4, 1948.  E. M. PALMER  2,440,970
SEISMOGRAPH RECORDING APPARATUS
Original Filed June 14, 1945   6 Sheets-Sheet 1

Inventor
ELTON M. PALMER
By G. M. Houghton
his ATTORNEY

May 4, 1948.   E. M. PALMER   2,440,970
SEISMOGRAPH RECORDING APPARATUS
Original Filed June 14, 1945   6 Sheets-Sheet 2
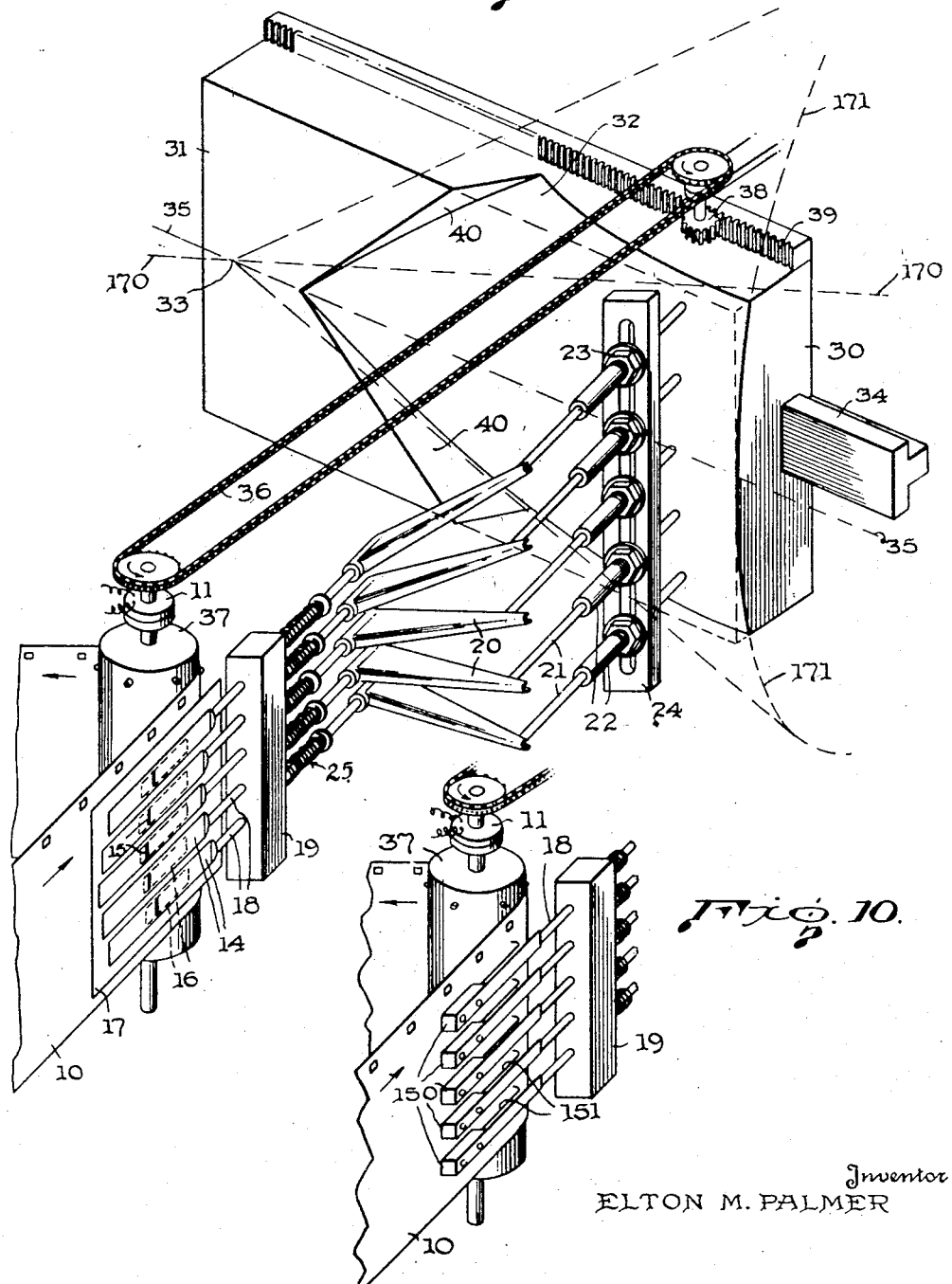
Inventor
ELTON M. PALMER
By G. M. Houghton
his ATTORNEY.

May 4, 1948.  E. M. PALMER  2,440,970
SEISMOGRAPH RECORDING APPARATUS
Original Filed June 14, 1945  6 Sheets-Sheet 3
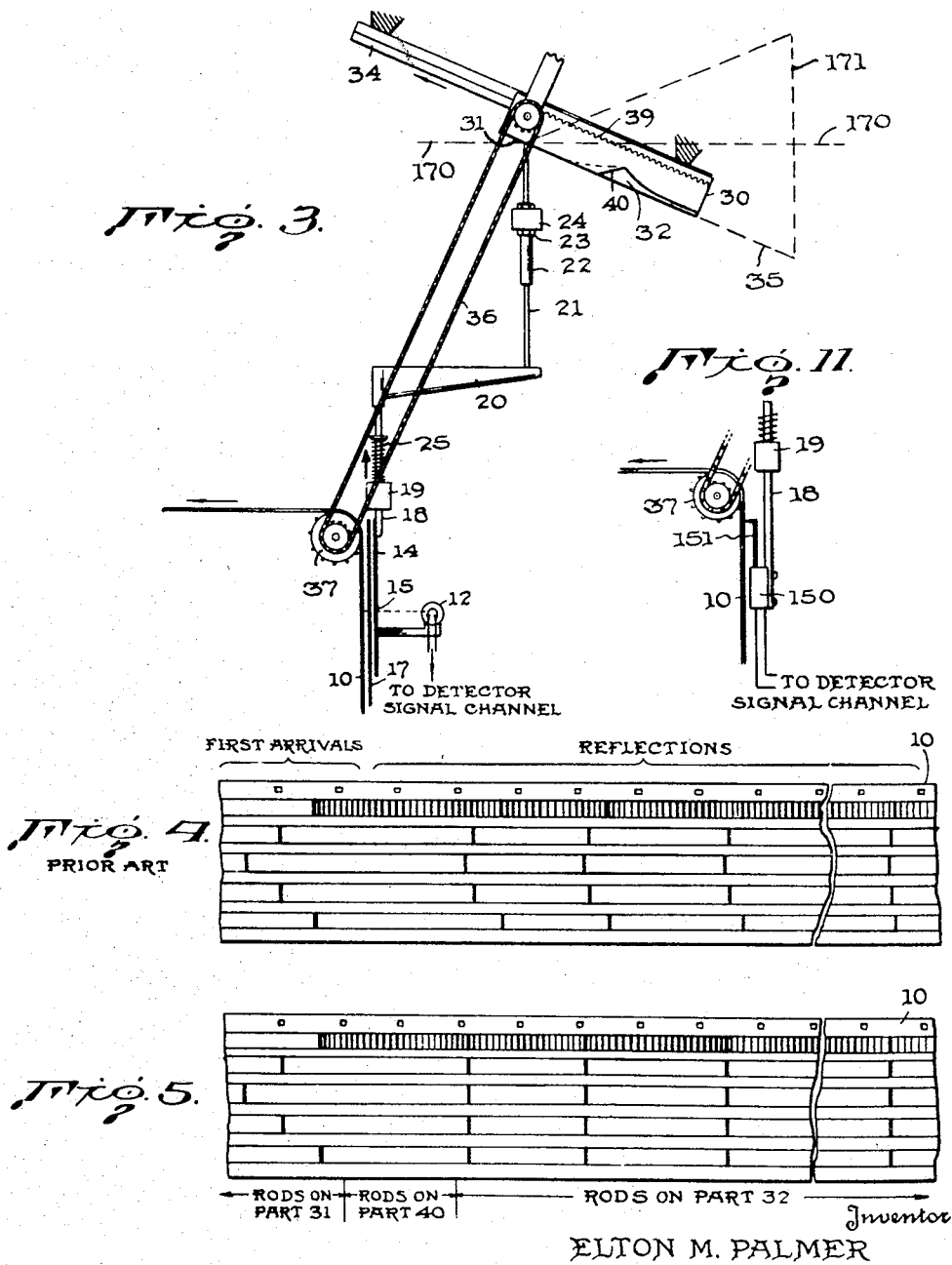
Inventor
ELTON M. PALMER
By E. M. Houghton
his ATTORNEY May 4, 1948.  E. M. PALMER  2,440,970
SEISMOGRAPH RECORDING APPARATUS
Original Filed June 14, 1945   6 Sheets-Sheet 4

Inventor
ELTON M. PALMER
By A. M. Houghton
his ATTORNEY

May 4, 1948.  E. M. PALMER  2,440,970
SEISMOGRAPH RECORDING APPARATUS
Original Filed June 14, 1945 6 Sheets-Sheet 5
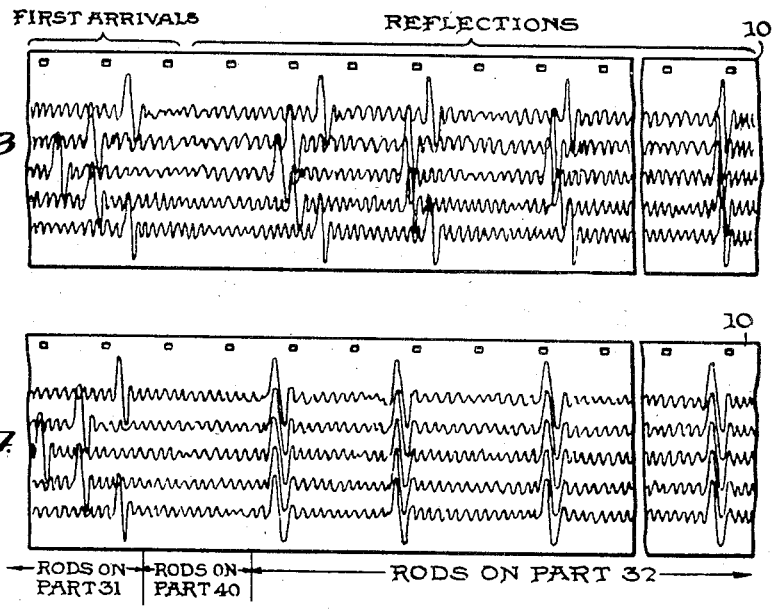
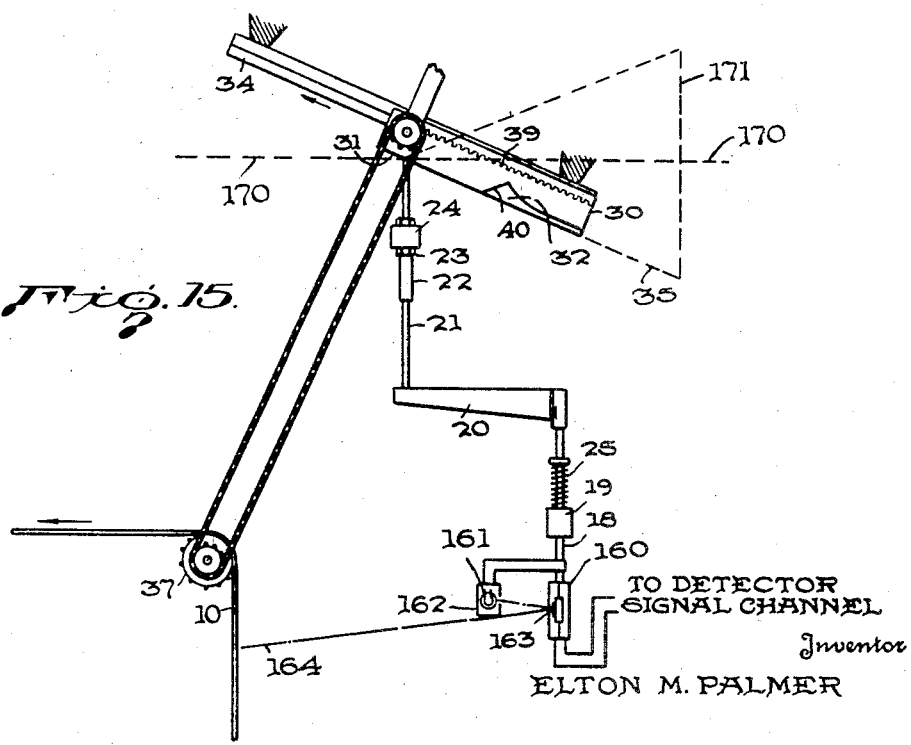
Inventor
ELTON M. PALMER
By G. M. Houghton
his ATTORNEY May 4, 1948.  E. M. PALMER  2,440,970
SEISMOGRAPH RECORDING APPARATUS
Original Filed June 14, 1945   6 Sheets-Sheet 6

Inventor
ELTON M. PALMER
By A. M. Houghton
his ATTORNEY

Patented May 4, 1948

2,440,970

UNITED STATES PATENT OFFICE 2,440,970

SEISMOGRAPH RECORDING APPARATUS

Elton M. Palmer, Oakmont, Pa., assignor to Gulf Research & Development Company, Pittsburgh, Pa., a corporation of Delaware Original application June 14, 1945, Serial No. 599,337. Divided and this application January 15, 1948, Serial No. 2,530

2 Claims. (Cl. 346—49)

This invention relates to improvements in apparatus for recording seismic waves in seismograph prospecting. More particularly, it concerns apparatus for multi-channel seismic recording which produces a record devoid of angularity.

The instant application is a division of my copending application, Serial No. 599,337, filed June 14, 1945, entitled Seismograph recording apparatus.

In seismograph prospecting, artificial earth tremors are created by firing a charge of explosive in the earth, and seismic waves are detected at a plurality of points spaced various distances from the explosion or "shot point." The detected tremors are commonly amplified and recorded on a moving tape together with the instant of shock initiation and time increments. The seismic waves propagated from the source are reflected and refracted in subterranean strata and in particular at the interfaces thereof, and from a study of the recordings inferences can be drawn as to the depth, dip, etc., of subterranean strata.

The seismograph records usually take the form of a film or paper band bearing a plurality of parallel record traces of the vibrations as picked up at the several detectors. Each trace shows an initial impulse which is the so-called first arrival, followed by a series of reflections. The reflections manifest themselves on the traces as more or less the same series of events which are characteristic wave trains coming from strata at various depths. The events are displaced with respect to each other in time on the different traces. An analysis of the traces is made to determine the attitude of underlying geological strata, particularly their depth and dip. Variations in depth caused by dip or by faulting are revealed by time differences of corresponding events on various correlated traces and records.

In the recordings, however, there are large differences in time which arise, not from geological dip or faulting, but from the geometry of the field setup. Some of the displacement of reflected events from trace to trace is due to the varying slant of the several wave paths; the part of the displacement due to the latter cause is commonly termed angularity. Consider two waves, one reflected from a shallow stratum and the other from a deep stratum, and two detectors, one near and the other far from the shot point. The wave paths of reflections from the two strata to the near detector are nearly the same as the vertical distances from the detector to the strata (down and up); angularity for the wave paths from each stratum is small. For the far detector, the wave paths are much longer than the vertical distances; angularity for these paths is relatively large, and is larger for the shallow stratum than for the deep stratum. The net result is that, particularly in the early part of a record, similar events picked up by the near and far detectors are widely displaced on the record tape and correlation may thereby be made difficult. The angularity displacements gradually decrease in magnitude as reflected waves from deeper strata are received toward the later part of the record.

By employing the apparatus of my invention, the time displacement of corresponding events due to angularity is eliminated so that what remains is the part due to geological variation of the strata, that is, extraneous displacements are removed in making the record, leaving only those which are of geological interest. These considerations will be clear in the more detailed analysis given below.

Direct visual inspection of seismograph records gives useful qualitative information before quantitative measurements are made. Certain characteristic fluctuations in the traces can be matched from record to record and tentatively correlated. In the heretofore usual records having angularity as above described, the usefulness of the record for purposes of correlation is somewhat impaired because as stated, in the first part of the record especially, corresponding events are considerably displaced in time along the length of the record. The displacement can be made somewhat less objectionable by running the recording film slower, that is, longitudinally compressing the record, or by spacing the several traces far apart laterally, but these expedients are not corrective and they are attended with disadvantages.

It is an object of this invention to provide apparatus for recording seismic tremors received at a number of spaced points in such a way that the time displacements between traces of corresponding events are devoid of angularity on the resulting record.

Another object of the present invention is to produce a record of a plurality of series of similar seismic wave events, in which similar events appear aligned across the record with respect to each other, except for displacements due to actual underground geological conditions, to facilitate visual comparison.

A further object of this invention is to provide recording apparatus for use in seismograph prospecting which produces a record on which the geological information sought is forcefully brought out without interferences of extraneous time differences due to angularity.

These and other objects are achieved by automatically removing the angularity correction from the record during the recording process by the means herein described. The apparatus may be more fully understood by reference to the drawings in which:

Fig. 2 is an isometric view of one embodiment of my invention, utilizing a single cam surface;

Fig. 3 is a plan view corresponding to Fig. 1, to a reduced scale;

Fig. 4 is a schematic reproduction of an uncorrected record of the type produced by the devices of the prior art;

Fig. 5 is a schematic reproduction of a corresponding record obtained with the aid of the apparatus of Figs. 2 and 3, or of Figs. 8 and 9;

Fig. 10 is an isometric view of the apparatus of Figs. 2 and 3 adapted to be used for pen recording elements;

Fig. 11 is a plan view corresponding to Fig. 10 to a reduced scale;

Fig. 13 is a schematic representation of an uncorrected variable amplitude record of the type produced by the devices of the prior art;

Fig. 14 is a schematic reproduction of a corresponding record obtained by means of the apparatus of Figs. 10, 11, 12 or 15;

Fig. 15 is a plan view of the apparatus of Figs. 2 and 3 adapted to be used for optical oscillograph recording;

Fig. 16 is a chart illustrative of the manner of determining the shapes of the cams in the apparatus of Fig. 8; and Fig. 17 is a diagram illustrative of certain principles on which the invention is based.

Figure 1:
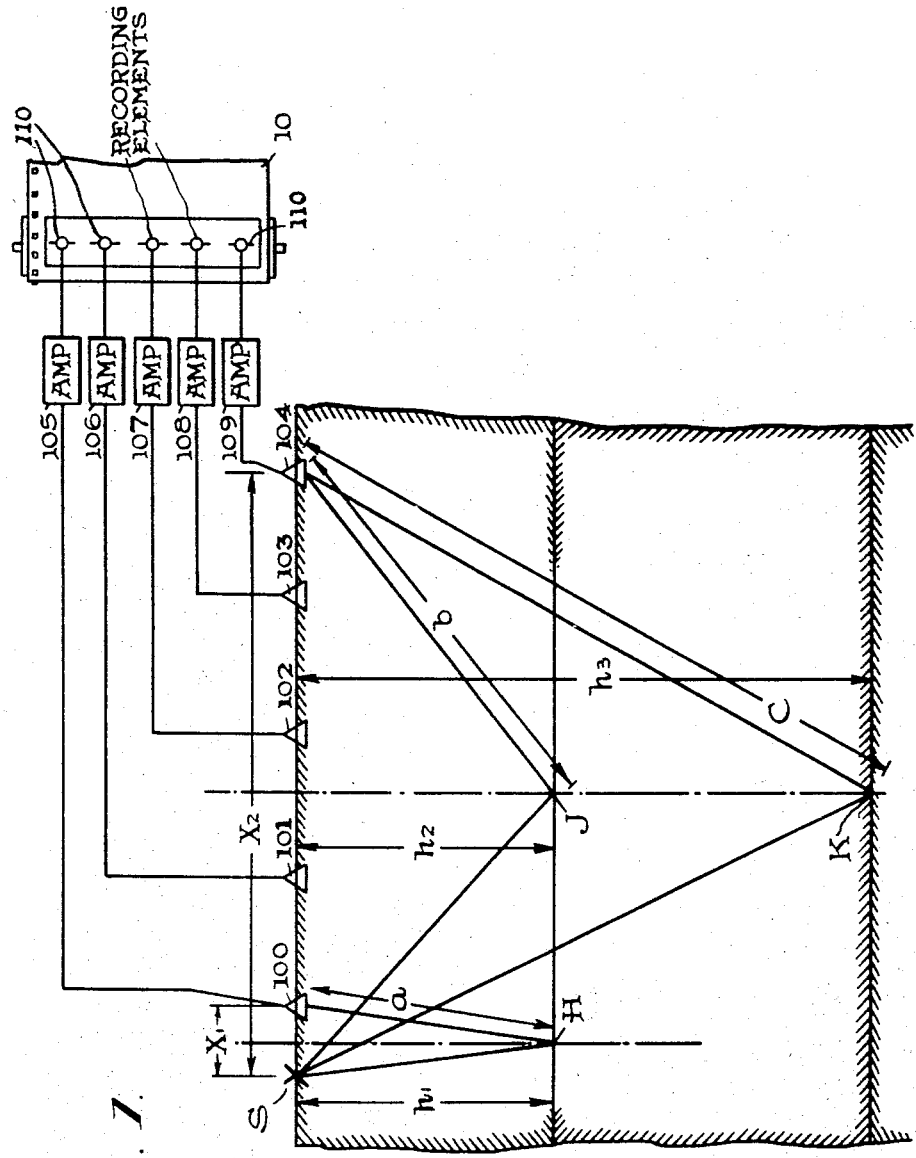
Fig. 1 is a diagram illustrative of the origin of angularity displacements.

Referring to the drawings, Fig. 1 illustrates angularity, as the term is used in the seismograph prospecting art, and shows why it varies with detector distance and depth or time. As shown, a series of detectors 100, 101, 102, 103 and 104 are set up in the earth at different distances X from a shot point S. The detectors are connected to individual amplifiers 105, 106, 107, 108 and 109 which deliver to recording devices 110 heretofore in a straight line, adapted to make a record on a traveling band 10. The recording devices 110 may be of any known type, such as electrically driven recording pens, galvanometers, variable density recording lamps, or electromechanical or electro-optical devices of any known kind.

On firing the shot, and considering the nearest and farthest detectors 100 and 104, reflected waves which originate at shot S are picked up at detectors 100 and 104 and recorded. Since these detectors are spaced from the shot, the wave paths are twice the length of diagonals $a$, $b$ and $c$, which are longer than twice the corresponding vertical distances $h_1$, $h_2$ and $h_3$. The consequent lag in arrival times over the time for a vertical path is said to be due to the angularity. Reflections from points H and J correspond to the same horizon but arrive at different times. The angularity at detector 100 is very small since path $a$ is very slightly longer than $h_1$. Path $b$, however, is much longer than $h_2$, resulting in greater angularity correction. Thus it can be seen that for a given reflecting horizon the angularity correction increases with detector spacing so that the arrivals do not fall straight across the record. As waves are received from deeper and deeper horizons, the angularity corrections decrease as can be seen by comparing the paths to points J and K. Path $c$ differs from $h_3$ by an amount smaller than the difference between $b$ and $h_2$. Thus the later reflections on a seismograph record fall more nearly on a straight line perpendicular to the edges of the record.

In analyzing or interpreting a record whose traces represent the tremors picked up at a series of detectors such as 100, 101, 102, 103, 104, or in interpreting a series of such records taken with adjacent setups of detectors and shot points, one may look for the reflection characteristic of a particular stratum as a characteristic impulse which persists across each setup. The unique identification of such an impulse is interfered with by the large angularity displacements of the impulse. Such angularity is removed by my invention thus permitting more definite identification of reflection impulses and facilitating the accurate geological interpretation thereof.

Figs. 2 and 3 illustrate a preferred embodiment of my invention for correcting angularity. It is shown incorporated in a variable density recorder of the type making use of a plurality of lamps 12, Fig. 3, each of which is connected to a seismograph detector signal channel in such manner that the lamp fluctuates in brightness according to instantaneous signal amplitude. The lamps are disposed adjacent a sensitive film or paper band 10, which is moved at a predetermined rate during the recording operation. The lamps are not shown in Fig. 2 in order to improve clarity of the figure. A set of strips 14 is provided, each having a slit 15 for one of the lamps 12, disposed over apertures 16, Fig. 2, in a stationary lightshield 17 as shown, and mounted on rods 18 guided for sliding movement in a support 19. Each rod has a channeled foot 20 engaging the ends of another set of push rods 21 sliding in guides 22 which are mounted with the aid of nuts 23 in a slotted support 24. Springs 25 are in compression and urge rods 18 in the direction shown.

Opposed to the opposite ends of rods 21 is a cam 30. The cam has a plane portion 31. Plane portion 31 of the cam gives way to two inclined surfaces 40 of such slope that for a given linear speed ratio between the sliding cam 30 and film 10 slit members 14 will move slowly to the right while rods 21 are sliding down portions 40, movement of the slits faster than film 10 preferably being avoided. Following the inclined surfaces 40 the cam has a curved portion 32, the surface of which is that of a circular cone, the apex 33 of which lies in the plane, near the end of the cam. One element of the cone, 35—35, lies in the plane 31 of the cam face along the central longitudinal axis thereof. The axis of the cone indicated by 170—170 is perpendicular to the plane of the slits; see Fig. 2. In order to more easily visualize the cone, its base is sketched in Fig. 2 as the line 171. In the side elevation view, Fig. 3, the axis of the cone is indicated by the line marked 170 and the base by line 171, and the element which lies in the plane 31 is shown as line 35. The cam is mounted in sliding relation on a fixed guide 34 for movement along the direction of element 35—35. The cam is driven in positive speed relation to the film through the agency of a sprocket-and-chain connection 36 between a roller 37 over which the film passes, and a pinion 38 driving a rack 39 on the cam. A clutch 11 is provided so that the cam mechanism may be engaged at the desired time and disengaged in order to be reset for the next shot. The clutch 11 may be electromagnetically controlled.

Fig. 3 shows the apparatus at the beginning of its cycle of operation with the rods 21 on the plane part 31 of the cam while Fig. 2 shows it near the end of its cycle with the rods 21 on the conical curved part of the cam.

In operation, the apparatus is initially set to the position indicated in Fig. 3. The film is set in motion somewhat prior to firing the explosive which initiates the seismic waves. The correcting cam mechanism is set in motion simultaneously with the shot by engaging clutch 11 (Fig. 2). Alternatively the shot may be fired automatically and clutch 11 automatically engaged at the same moment by operation of known coordinating switches and safety devices usually employed. While the first arrivals are being received, rods 21 are on plane portion 31 of the cam and the slits are in vertical alignment. Recording of these first arrivals and also of subsequent impulses is effected by applying the amplified seismic detector signal to lamps 12 (see Fig. 3, the lamps have been omitted from Fig. 2 for clarity as previously stated) mounted on the strips 14, as shown in Fig. 3. The lamps 12 fluctuate in brightness according to the instantaneous signal amplitude and the light of each lamp shines through its associated slit 15 onto the photographic film 10. Thus the periodic detector signals are recorded on the photographic film in the form of variable density tracks. Thus the first arrivals are recorded in displaced relation to each other. Shortly thereafter rods 21 move over surfaces 40 and on to the conical portion 32 of the cam, so that when the reflected events come in, the slits are disposed along a curve such as to bring the traces in vertical alignment if no geological anomaly is present, or exhibiting only such misalignment which may be ascribed to geological conditions.

Fig. 5 shows a record as obtained with the apparatus of Fig. 2 (assuming level strata) and Fig. 4 shows an ordinary uncorrected record of the same events. The effective curvature of the cam progressively decreases and the trace displacement becomes less and less.

Figures 6, 7, 8, 9, 12:
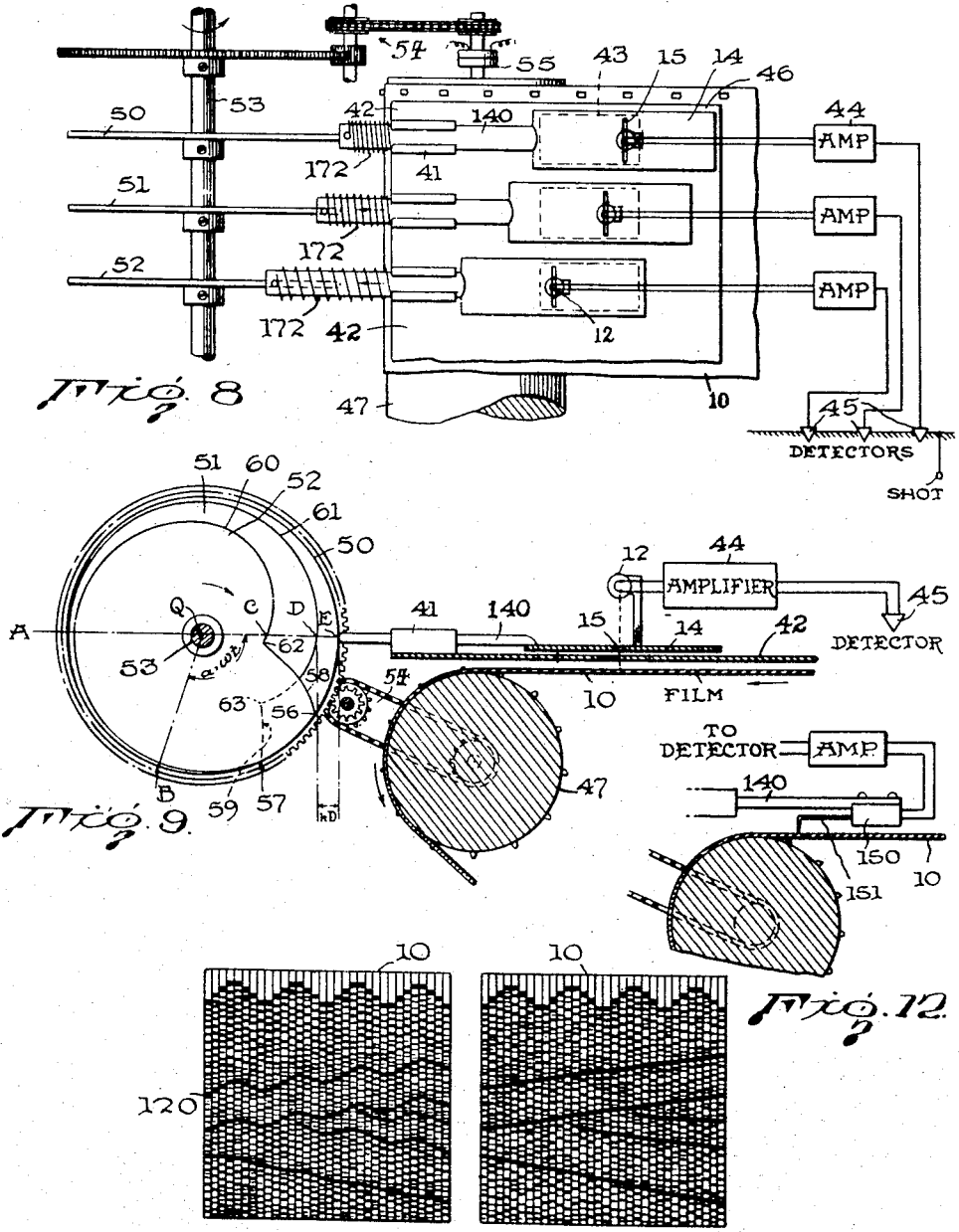
Fig. 6 is a schematic representation of a group of records as recorded without angularity correction.
Fig. 7 shows a corresponding group of records obtained with the aid of the apparatus of Figs. 2 and 3 or of Figs. 8 and 9.
Fig. 8 is a view in elevation of a modification utilizing spiral cams.
Fig. 9 is a view in plan of the apparatus of Fig. 8.
Fig. 12 is a view of a modification of Fig. 9 utilizing spiral cams and pen recording elements.

Figs. 6 and 7 illustrate one of the chief objects of the invention as it applies to visual use of seismograph records described above. The variable density records shown in Figs. 6 and 7 are a succession of light and dark regions on a relatively narrow band, a very dark region resulting from a large instantaneous signal in one direction and a very light region resulting from a very large signal in the other direction. Such recordings possess the advantage that the received tremors appear as distinct markings on a band sufficiently narrow to be placed close together and various density traces or tracks may be recorded closely adjacent to each other. In a group of such bands each made from a detector station, the relative values of various events are easily discerned. One may place side by side, as in Figs. 6 and 7, a number of such recordings, all made with the same time scale and obtain a mosaic-like array of light and dark bands which is essentially a time plot of received events. Such a time plot is traversed by light and dark regions which persist from track to track as stripes, and since each is the result of energy reflection from an underground geological stratum, one has in effect a shaded graph which pictures a cross section of the earth. The easily comprehended variable density traces give a strong visual representation of the seismic events. The figures represent schematically a group of variable density records 10 which might be obtained from a series of shot points and detectors arranged in a conventional straight line. These records are shown placed in juxtaposition, corresponding to the arrangement of the seismograph apparatus on the earth's surface, for the purpose of delineating the dip and depth of various subsurface strata. The seismic events in the record arrangement shown give a qualitative picture of the relations between certain strata through a vertical plane or cross-section. Certain of the events, which have been exaggerated in boldness in the sketches, show a consistent alignment across each record and from record to record. In seismograph interpretation practice, events occurring with such alignments are considered as evidence of the presence of reflecting strata and from them the dip and depth of the strata are computed. It is evident that many random alignments of limited extent will in general be observable and will be readily confused with the useful alignments which must be consistently traced over reasonably large extends. Thus it is desirable ot remove, insofar as possible, the factors tending to confuse the proper correlation of seismic events.

Fig. 6 illustrates the way in which the angularity effect tends to confuse the interpretation of a group of records made in the heretofore conventional manner of the prior art. Reflection impulses 120 show a wavy appearance due to angularity misalignment which makes the horizon difficult to follow. It often leads the interpreter to jump a wave cycle in his correlation, resulting in erroneous geological interpretation.

Fig. 7 illustrates a similar set of records from which the angularity has been removed in the recording process, as by the agency of the apparatus of Figs. 2 and 3. Fig. 7 shows how a group of records made by means of this invention resolve the reflection impulses into clear-cut alignments. Interpretation of groups of such records is clearly facilitated by the improved clarity of seismic event correlation.

In modern reflection seismograph prospecting practice, detectors are often placed on both sides of the shot, and the apparatus of Figs. 2 and 3 is shown in a form for correcting angularity in detecting waves on both sides of the shot. If all the detectors are on one side only of the shot, the several rods 21 will be disposed all on one side of line 35—35. In the figures only a few slits and actuators therefor are shown, for clarity. In working embodiments a larger number of slits is provided, corresponding to the relatively large number of detectors at present used for each shot. The spacing of rods 21, Fig. 2, in the slots of support 24 is proportional to the spacing of detector stations, and may be adjusted if desired by loosening nuts 23 and sliding guides 22 in the slot of support 24.

Figs. 8 and 9 show a modification of the invention making use of a plurality of spiral cams.

In the apparatus of Figs. 8 and 9 a plurality of strips 14 having slits 15 are mounted on rods 140 guided in guides 41 on a light shield 42 which is provided with apertures 43. A set of lamps 12 are provided over the slits, each connected to a seismograph amplifier 44 and detector 45 in a known manner such that the lamp fluctuates in intensity above the below a median value in accordance with instantaneous signal strength, thereby producing traces on a film 10 traveling over a roller 47.

The slits are controlled by a set of cams 50, 51, 52, of shape determined as described below, fixed on a shaft 53 rotated at a definite angular speed with respect to roller 47 through the agency of suitable gearing 54 and clutch 55. If, as is often the case, the detector corresponding to the trace adjacent the edge of the film 10 is at the shot point, no correction is necessary, so the cam 50 may be a circle, or alternatively the corresponding strip 14 may simply be fixed. The other cams have circular portions, of the same radius as cam 50, which give way at points 56, 57 to inclined portions 58, 59, which in turn give way to spiral portions 60, 61, beginning at points 62, 63. Springs 172 preferably should be provided to keep sliders 140 against the cams, see Fig. 8. The cam shaft is initially set so that rods 140 rest at point B on the circular part; that is, angle $EQB=0°$. Point E represents the contact point of the rod 140 on the cam, the center of the rotation of the cam being designated by Q. Point B is the starting point of the cam, that is the rods 140 initially contact the cams at point B. The angle EQB is therefore the angular travel of the cams and increases with time since shaft 53 is driven from the film 10 through mechanical connection 54. The film 10 is started just before the shot is fired, and clutch 55 engaged at the shot moment, thus setting the cam shaft 53 into motion. Then the first arrivals are received with the slits in vertical alignment. The first arrivals remain displaced as in an ordinary record; see Figs. 4 and 5. Then each rod in turn slides down portions 58 and 59 to points 62 and 63, in time to set the slits for maximum correction during receipt of the earliest reflected events. Thereafter the slits gradually approach re-alignment again according to the required amount of correction. The correction usually becomes so small before point B has come back to its initial position that it may be eliminated completely in the last few degrees of cam rotation.

Since the record film 10 and the cams move at predetermined relative velocities, each slit at any instant during the recording is displaced by an amount predetermined by the shape of the corresponding cam. As a result of the control, the series of reflected wave events is recorded in the desired vertical alignment shown in Fig. 5.

Following are the considerations governing the cam shapes of the apparatus of Figs. 8 and 9, and the curved surface 32 of Figs. 2 and 3.

The general formula for angularity correction A (in seconds) for any detector located a distance $x$ from the shot point and receiving at time $t$ after the shot an impulse reflected from a stratum at a depth $h$, is given by the following readily derived relations:

$$A = t - t' = \left[(t')^2 + \left(\frac{x}{V_h}\right)^2\right]^{1/2} - t' \quad (1)$$

in which $t$ is the observed travel time in seconds, $t'$ is the time in seconds for a pulse to travel from the shot point to a stratum at depth $h$ and return to the shot point, $x$ is the shot-detector distance and $V_h$ is the average velocity to the stratum at depth $h$. The value of $V_h$ is customarily given in terms of $h$ by a calibration chart based on empirical data. If $h$ is assigned arbitrary values, corresponding values for $V_h$ will be found from the chart; and from the evident relation, $V_h t' = 2h$, corresponding values for $t'$ may be obtained. Thus for given values of $h$ and $x$, corresponding values for A and $t$ may be computed from the above formula.

If the recording paper speed is $k$ inches per second, the displacement of any slit 15 for any value of A must be $kA$ inches. The angle $a$ in radians through which the cam (or cam shaft 53, Fig. 8) rotates in $t$ seconds is $a = wt$, where $w$ is the angular velocity in radians per second. Thus the required displacement such as DE of Fig. 9 at all points around the circumference of the cam are determined by corresponding values for $a$ and $kA$, computed as described above from given values of $h$ and $x$. The radius QE may have any convenient length.

For the purpose of subsequently computing weathering corrections, it is desirable as mentioned above for the slits to be in line across the record until after the first arrivals have been recorded. This requires the rods 140 to remain at the distance QE, Fig. 9, until $a = wt_1$, where $t_1$, the first arrival time, equals the shot-detector distance divided by the velocity in the bed through which the first arrival travels. Points 57 and 56 correspond to first arrival times after which the slits are allowed to descend to the cam surfaces 60, 61 as computed above. The rate of displacement of the rods between points such as 57 and 63 should closely equal but not exceed $k$ inches per second since the slits should not move faster than the recording paper.

Fig. 16 shows by way of a specific example two cam curves, computed for detectors at 2000 feet and at 5000 feet from the shot point. The velocity $V_1$ in the first arrival bed is taken as 3000 feet per second; a representative value. The data for $V_h$ versus $h$ were taken from a typical field calibration chart. The angular velocity $w$ of the cam is taken as $\pi/2$ radians per second and the velocity of the recording paper is assumed to be such that the paper moves a distance Z in 0.01 second. Hence the distance indicated by Z along the radius in Fig. 16 corresponds to an angularity correction of 0.01 second.

Again considering the apparatus of Figs. 2 and 3, this embodiment is based on the fact that the relation between the quantities A, $t$ and $x/V_h$ where $V_h$ in this case is a constant, may be written as the equation of a circle. Thus Equation 1 can be put in the form:

$$\left(\frac{x}{V_h}\right)^2 + (A-t)^2 = t^2 \quad (2)$$

This equation in terms of time may be multiplied by $k^2$, in which $k$ is the velocity of the record, to convert it into terms of distances as follows:

$$\left(\frac{kx}{V_h}\right)^2 + (kA - kt)^2 = (kt)^2 \quad (3)$$

Equation 3 specifies a circle of radius $kt$ tangent to the X-axis, as at T in Fig. 17. The circle expands with time at a rate such that its radius at any instant equals the length of record $kt$ which has passed since the firing of the shot. The quantity $kx/V_h$ is the distance from the point of tangency T at which the corresponding angularity correction is $kA$. Fig. 17 indicates how the circle can be used to supply corrections to record 10 through rods. In the simplest embodiment the radius of the circle would be fixed and the correction would be good only at the one instant when its radius equals $kt$. If the radius is made to vary directly with time to expand the circle as called for by Equation 3, the corrections will be appropriate throughout the length of the record.

The cone of Figs. 2 and 3 is a practical means of obtaining a circle of expanding radius to meet the requirements above. The cone is cut at a convenient taper determined by the ratio of speeds of translation of the cone and the film and is driven at a predetermined rate such that the equation is satisfied.

Fig. 17 shows diagrammatically that any number of rods may be added for additional detectors. The various rods should be spaced from the point of tangency T by distances such as $kx'/V_h$ which are proportional to the corresponding shot-detector distances.

When the velocity $V_h$ of seismic wave varies with depth, normally increasing with depth, the compensation just described is approximate. However, the compensation can be improved if desired by accelerating the cone in the latter part of the record; or the same effect can be achieved by maintaining uniform motion and forming the cone surface with an appropriate bell-shaped flare towards the large end. Similarly, the shape of the cone may be modified slightly to satisfy any particular conditions. The rods 21 in Fig. 2 may also be moved closer together toward the end of the record; that is, by variably compressing with time the distances $kx/V_h$ in Fig. 17. Speeding up the cone or increasing its radius are less accurate but simpler than moving the rods. Any residual error in the corrections resulting from use of any of these expedients will be practically negligible. This is because the values of the angularity correction for waves from deep strata, which in general are the ones exhibiting the increased velocities, are in themselves very small (cf. Fig. 1 and the corresponding description).

While I have illustrated my invention as applied to variable density recordings, the same may alternatively be used for other types of recordings. Conventional seismograms are frequently made by variable amplitude recording, the traces in this case being wavy lines whose undulations correspond to the received earth tremors. In such recordings it is of importance to avoid overlapping of traces. Large impulses having time displacement result in confusion or entanglement of traces which often defies analysis. Such large impulses are likely to occur in the early part of the record when angularity displacements are also greater. However, if the time displacement is removed, all traces swing together in unison and thus keep out of each other's way. Such an impulse when recorded without angularity as by my invention causes an otherwise confused tangle of traces to become resolved, revealing any alignment which is the characteristic criterion of a reflection.

In the application of my apparatus to variable amplitude recording, the devices 110 (Fig. 1) may be pen recording elements, such as well known piezo-electric crystal driven pen elements or electromagnetically driven pen elements. Slits 15 of Figs. 2 and 3 are not required when such pen recording devices as 150 (Figs. 10 and 11) are used. Correspondingly, the pen element may be mounted on arm 18 (Figs. 2 and 3) or 140 (Figs. 8 and 9) eliminating parts 12, 14, 15, 16 and 17.

Figs. 10 and 11 show how such pen elements may be applied to the apparatus of Figs. 2 and 3. The pen elements 150 are mounted on arms 18, each movable pen arm 151 having a stylus resting on the record tape 10. The pen element causes the stylus to move transversely in accordance with the detector signals, and the cam mechanism similar to that of Figs. 2 and 3, through the arm 18 moves the element longitudinally so that reflected impulses will be recorded in time alignment on all traces.

Fig. 12 shows how a pen element may be mounted on the apparatus of Figs. 8 and 9 instead of using lamps and slits. In Fig. 12 the pen element 150 carrying stylus 151 is mounted on arm 140 and its mode of operation is similar to that in Figs. 10 and 11.

A similar arrangement may be provided when reflection galvanometer type of oscillographs and photographic recording are used to obtain a variable amplitude trace, the optical system being arranged as illustrated in Fig. 15. In this case the oscillographs 160 are usually placed some distance from the photographic tape so as to obtain optical magnification of motion. The numerals in Fig. 15 refer to parts having similar function as parts bearing the same numeral in Fig. 3. The oscillograph element 160 is mounted on arm 18 operated through parts 21 and 20 by the correcting cam. Also fastened to arm 18 is a light source 161 shielded by cover 162 so that light is allowed to fall only on galvanometer mirror 163 which is caused to oscillate by electromagnetic means about the longitudinal axis, thus causing the light beam 164 to move transversely across tape 10 in accordance with the received earth tremors. Action of the angularity correcting mechanism moves the beam longitudinally on the tape so as to bring reflected events into alignment as illustrated in Fig. 14.

The resulting improved clarity obtained by means of my invention in variable amplitude recording is illustrated by Figs. 13 and 14, which are similar to Figs. 4 and 5. Fig. 13 shows a simplified variable amplitude seismograph recording made in the heretofore conventional manner. Actual tapes are much more complicated and show even more overlapping of traces. One may observe that there is difficulty in tracing the curves through the tangle of lines which occurs at the region of large amplitude pulses. On the other hand Fig. 14 shows a similar record made in the manner of this invention and in which the angularity is removed. One may readily note the simplification which results in improved clarity of the reflected events.

The apparatus of my invention may further be used in the process of re-recording of seismograms for purposes of special analysis. For such purposes it has been customary to originally make a variable density record on transparent film. Other types of sound-on-film records may alternatively be made. Such a record is easily reproducible by allowing a light source to shine light through a restricted area of the record on to a photocell. The photocell response may then be amplified and recorded. Various useful operations may be performed on the photocell signals such as filtering, differentiation, summing signals from various traces, etc.

If one has on hand a conventional seismograph recording of the reproducible type and having angularity displacements between events, my invention may be used to obtain therefrom a recording of the same events having no angularity displacements, thereby achieving the simplification of interpretation resulting from such recordings. Filtering, etc., may be simultaneously carried out during such recording if desired. In such re-recording operations each of the elements 110, Fig. 1, is actuated by electrical signals coming from a photocell whose light input is modulated by the corresponding trace of the original recording. These photocells are in space alignment so that their signals have the same time sequence as the originally recorded events, while the recording elements 110 are moved in proper relationship by the agency of my apparatus. Thus the signals stated in the foregoing specification to be derived from geophones or detectors may be derived from them in an indirect manner by the use of an intermediate recording of a reproducible form. In such case the shaft will be connected through suitable gearing or through chain and sprocket to the mechanism which drives the intermediate record in the reproducing process, as well as to the correcting apparatus shown connected through chain 36, Fig. 2. My apparatus will then eliminate the angularity with a high degree of precision. Alternatively in the re-recording the apparatus may be used to displace the photocells from alignment in the opposite sense and cause the angularity correction to be removed with equal precision.

What I claim as my invention is:

1. In a system for recording on a longitudinally moving record receiving band the seismic impulses from a seismic source received at a plurality of distant seismic receiving stations by means of a plurality of adjacent recording elements disposed to make contiguous records of seismic events received via electrical transmission channels from their respective seismic receiving stations, the improvement which comprises means for independently longitudinally moving each of the recording elements by a follower bearing on a moving cam surface, said cam surface being in the form of a cone moved along an element thereof, each of said followers being guided to move in a line at right angles to the axis of said cone and at a lateral distance from said cone element which is proportional to the respective distance of the associated receiving station from the seismic source, and means for moving said cam at a speed proportional to the speed of the record receiving band.

2. In a system for recording on a longitudinally moving record receiving band the seismic impulses from a seismic source received at a plurality of distant seismic receiving stations by means of a plurality of adjacent recording elements disposed to make contiguous records of seismic events received via electrical transmission channels from their respective seismic receiving stations, the improvement which comprises means for independently longitudinally moving each of the recording elements by a follower bearing on a moving cam surface, said cam surface having such shape that progressive cross-sections thereof present a circular arc of continuously increasing radius, said followers being guided so that their points of contact with the cam surface lie on a circular arc thereof, each point of contact being displaced a lateral distance from the median plane of said cam which is proportional to the distance of the associated receiving station from the seismic source, and means for moving said cam at a speed proportional to the speed of the record receiving band.

ELTON M. PALMER.